Patented June 14, 1949

2,473,395

UNITED STATES PATENT OFFICE 2,473,395

HOPS TREATMENT

George Segal, Great Neck, N. Y.

No Drawing. Application December 30, 1944,
Serial No. 570,761

7 Claims. (Cl. 99—50.5)

The invention is a method of producing dried hops for use in brewing lager beer, etc., and its object is a system of treating the freshly picked crop in such manner as to furnish for the market dried hops having the same fresh aroma and flavor after many months of storage, as they possessed when dried immediately after picking and used within a few months.

Brewers are well aware that only those hops promptly dried after picking and used within about the first six weeks or two months, yield the fine flavor to beer that is so much desired and so highly prized. The prevailing practice is to dry and bale hops as promptly as possible after picking and then hold the bales in cold storage, until needed for use. The purpose of cold storaging the dried hops is to retard deterioration of quality, but it does not suffice to retain the fresh aroma, flavor and brewing value which they possess during the first few weeks even though the storage temperature is kept below 32° F. Over the years, many proposals have been published and many patents have been issued here and in Germany, directed toward the capture or preservation of this elusive aromatic flavor and brewing value initially possessed by dried hops, but the problem seems not to have been solved, and this is true notwithstanding that the factor of cost is not a limitation upon its solution.

However, I have found a method of treatment which is practical and does serve to retain or prolong the initial fresh flavor for at least the period between the crop seasons, and possibly longer, and which is not too difficult to carry out nor substantially more expensive than the present practice wherein the dried hops are held in cold storage.

It should be understood that in the present practice the hops, having been picked at the moment they are ripe, are necessarily held in temporary storage for a short while but only until kiln space is available for drying them. The drying operation has always to be rushed because it is known that delay at this juncture is at the cost of quality. As soon as the hops are dried they are baled, and those bales not immediately put to use are put, usually, in cold storage, as stated, to be used or shipped to brewers as called for. Ordinarily, about ¾ of the crop will have more or less lost its ability to yield the initial fresh aroma by the time it is shipped.

This should not be taken as meaning that such hops are bad or spoiled, but merely that they no longer yield the prime flavor and brewing value that the hop-buyer recognizes as the property only of properly dried hops less than about two months old. This period of freshness of the dried hops has been called the fresh aroma period and will be so referred to herein. The invention aims to extend or prolong it. Its normal duration varies somewhat according to the nature of the hops in the first instance, and the promptness with which they were dried, and perhaps other conditions, but generally, it can be assumed to be about two months, and in any event not more than three or four months when properly kept in cold storage.

In accordance with the preferred practice of this invention, the freshly picked hops are treated as follows, it being understood that the invention resides in the general plan rather than in the details about to be described:

The freshly picked hops are placed as usual in temporary receiving bins. They are held in these bins only until such time as they can be further treated, either in the same bins or in others especially adapted for the purpose. Unless this interval is very short they are chilled, while so held, to near but not below freezing, say 35° F. and in the meantime they are preferably enveloped in a non-oxidizing atmosphere. These conditions can be supplied in any convenient way, but most conveniently by distributing crushed solid carbon dioxide, Dry Ice, amongst the layers in the bins. The carbon dioxide sublimes slowly, permeating the mass and at the same time lowering the temperature, or helping to lower it if other refrigeration is also used. It is not difficult to correlate the amount of Dry Ice to the particular circumstances so that it will provide both the relatively inert atmosphere and the reduced temperature without other refrigeration. The temperature of 35° F. is quickly realized, and rapid chilling is desirable, and once attained can easily be continued by periodic small additions of the Dry Ice.

These hops, it will be understood, are the freshly picked or green hops containing all their natural juices, resins and oils and the chilling is merely for the purpose of arresting any chemical change, or at least retarding it, during the interval necessary between picking and the further treatment. This interval must be short despite the reduced temperature and inert atmosphere. The maximum permissible duration has been determined as about six weeks. During this period the hops appear to undergo only insignificant changes, but a shorter interval is recommended out of caution.

The further treatment consists in further refrigeration, depressing the temperature from the 35° F. just mentioned, to below the freeze point of the hop juices (determined to be 30° F.), say to about 25° F., and preferably to between +10° and −10° F., taking particular care, however, that the rate of cooling through the freeze point is extremely slow, e. g., not greater than 1° F. per hour. For this purpose the bins are equipped with refrigerating coils adapted for close regulation. After the freeze point has been passed, the rate of cooling can be increased if desired without injury. The inert atmosphere is continued, as by the use of more Dry Ice, this being more convenient and economical than the use of nitrogen or other non-oxidizing gas; if the bins are reasonably hermetic, a carbon dioxide atmosphere once established will continue almost indefinitely. Some dilution with air is always likely but the atmosphere should contain only a small percentage of free oxygen.

For the freezing operation the hops are placed in open mesh bags, if not already so packaged, and they are packed into these bags with sufficient firmness so that while permeable to the gas, when frozen they constitute discrete bodies or blocks. They can therefore be conveniently handled and stacked in the warehouse and they are held in this form and at the subfreezing temperature, and desirably in the inert atmosphere as stated, until the time has come for resuming their treatment in preparation for use.

At such time they are withdrawn from storage and caused or allowed to thaw but only very slowly, not exceeding 1° F. per hour, as the temperature rises through 30° F. The bags are then immediately emptied into the drying kilns and the hops dried in the usual way and then baled or otherwise packaged for shipment. The drying may thus occur many months after the picking. It should be done promptly upon thawing so as to minimize the opportunity for oxidation, and desirably within 24 hours, and preferably in a relatively inert atmosphere, which is again accomplished by introducing some Dry Ice into the kiln. The drying is done with the least possible air blow, no more than enough to carry off the moisture and at a temperature of between 100° and 120° F.

It is preferred to introduce also a small amount of sodium or other bisulfite salt into the hops before drying or even before thawing, as a further preventive of oxidation or for the blanching effect if that is desired. The bisulfite can be mixed with the Dry Ice used during storage or may be placed in the kiln and under the effect of the heat slowly develops $SO_2$ to act as an antioxidant. The amount used need be no more than produces a slight blanching.

Hops prepared as above, even though many months old, possess the initial fresh aroma and brewing value to an extent practically indistinguishable from that of hops which have been actually picked, dried, baled and used within the normal fresh aroma period and they appear to keep in the bale at least as well as hops that have not been frozen before being dried, and they may be used by the brewer in precisely the same manner.

The chemistry of the bittering and aroma-giving components of the hop cone is extremely complicated and I do not venture to explain the reactions that take place, or do not take place, by freezing the hops before drying them, but it has been ascertained that in these hops the percentage of alpha and beta resins remains at practically their optimum values and respective ratio as compared with hops of the same origin dried immediately after picking and stored under good conditions not more than two months, while the gamma or hard resins that are considered as useless for brewing purposes run mostly below 10%, and not above 15%, of the total resin content. A very slight but inappreciable diminution of the essential oils is observed.

By virtue of the ability thus in effect to prolong the fresh aroma period, it is remarked that the hops producer may now substantially reorganize his working program. He may, for example, divide his crop, theoretically or actually, into say twelve parts, one to be sold each month or so. The part to be used within the normal fresh aroma period can be immediately dried and sold without first freezing and exactly as heretofore so as to reach the brewer before the fresh flavor has departed. The remaining ten or eleven parts will be promptly frozen as described and warehoused in the frozen state, to be withdrawn, one part each month for the remainder of the year and immediately thawed on withdrawal, dried and shipped to use. He thus furnishes dried hops having the desired fresh aroma throughout the whole interval between seasons or longer, each successive bale being as desirable from the brewer's standpoint as those dried within the first two months.

Besides thus benefiting the brewer, this simplification will be seen to be coupled with a particular and important advantage to the hops producer in that he now requires only a fraction, one-twelfth in the case taken for example, of the kiln capacity he has heretofore required for the same size crop. Heretofore the drying of the whole crop has had to be crowded into the space of about ten days after the start of the harvest, and that has required a large kiln capacity and of course extra labor and rapid work, often too hastily done, whereas by this new system the drying operation is spread out over the whole year, permitting a smaller kiln and greater care and a smaller force of skilled labor, which operating advantages are found to offset the expense of the freezing and the warehousing at subfreezing temperature.

I claim:
1. The method of treating hops which consists of freezing the hops while they still retain substantially their fresh aroma, the temperature being depressed through the temperature of about 30° F. at a rate not substantially greater than about 1° F. per hour, then holding the hops in frozen state for a storage period, then thawing the hops, and thereafter drying the hops.

2. The method of treating hops which consists of freezing the hops while they still retain their fresh aroma, holding the hops in frozen state for a storage period, then thawing the hops, the temperature being raised through the temperature of about 30° F. at a rate not substantially greater than about 1° F. per hour, and thereafter drying the hops.

3. The subject matter of claim 1, characterized by the fact that in thawing the hops, the temperature is raised through the temperature of about 30° F. at a rate not substantially greater than about 1° F. per hour.

4. The method of treating hops which consists of chilling hops, after picking, to a point somewhat above their freezing point and holding the hops chilled but unfrozen for less than about six weeks, then freezing the hops, the temperature being depressed through the temperature of about 30° F. at a rate not substantially greater than about 1° F. per hour, then holding the hops in frozen state for a storage period, then thawing the hops, and thereafter drying the hops.

5. The subject matter of claim 4, characterized by the fact that in thawing the hops, the temperature is raised through the temperature of about 30° F. at a rate not substantially greater than about 1° F. per hour.

6. The subject matter of claim 5, characterized by the further step of providing a non-oxidizing atmosphere for the hops during the period from substantially the beginning of the chilling to substantially the end of the thawing.

7. The subject matter of claim 4, characterized by the fact that the step of chilling the hops is performed by distributing solid carbon dioxide through the mass of the hops and the subsequent subliming of the carbon dioxide.

GEORGE SEGAL.

REFERENCES CITED

The following references are of record in the file of this patent:

UNITED STATES PATENTS

| Number | Name | Date |
| --- | --- | --- |
| 92,934 | Brainard | July 27, 1869 |
| 257,935 | Gebhard | May 16, 1882 |
| 1,161,272 | Wennerstein | Nov. 23, 1915 |
| 1,232,271 | Franks | July 3, 1917 |
| 1,821,106 | Milani | Sept. 1, 1931 |
| 2,178,675 | Thomas | Nov. 7, 1939 |
| 2,322,493 | Wilson | June 22, 1943 |
| 2,333,850 | Dunkley | Nov. 9, 1943 |
| 2,341,152 | Moskovitz | Feb. 8, 1944 |